A. W. KIDDER, OF SOUTH NORRIDGEWOCK, MAINE.

Letters Patent No. 88,644, dated April 6, 1869.

IMPROVED MEDICAL COMPOUND.

The Schedule referred to in these Letters Patent and making part of the same.

*To all whom it may concern:*

Be it known that I, Mrs. A. W. KIDDER, of South Norridgewock, in the county of Somerset, and State of Maine, have invented a new and improved Medical Compound; and I do hereby declare that the following is a full, clear, and exact description thereof, which will enable those skilled in the art to make and use the same.

The object of this invention is to supply a simple and safe family medicine, which operates to cure or palliate all diseases arising from an impure state of the blood, by purifying and invigorating the blood.

Its general effect is tonic and cleansing.

It is entirely botanic, and is peculiarly effective in cases of scrofula or scrofulous complaints, salt-rheum, erysipelas, canker, cancerous humors, catarrh, bronchial affections, rheumatism, neuralgia, and most all diseases arising from an impure state of the blood.

Its composition is as follows:

- Pipsissewa, (so called,) two ounces.
- Spikenard, (*Aralia racemosa,*) two ounces.
- Bark of mountain-ash, two ounces.
- Bark of the root of yellow ash, two ounces.
- Thoroughwort, (boneset,) three ounces.

The above ingredients are steeped, for twenty-four hours, in about a gallon of good rum, after which the rum is strained off, and to the same ingredients is added from one-third to one-half a gallon of soft water, in which the ingredients are allowed to steep for two weeks, when this latter decoction is strained off, and added to the rum-tincture, before described.

The compound is then ready for use.

Directions for Use.

Take a teaspoonful three times a day, one-half hour before eating.

For colds, take a table-spoonful (after going to bed) once in ten minutes, till in a perspiration, then take a table-spoonful in the morning.

For croup, give a teaspoonful once in from five to ten minutes, till relieved.

For cholic or cramp-pain, take a table-spoonful once in five minutes, till relieved.

I claim as new, and desire to secure by Letters Patent—

The medical compound, composed substantially as herein described.

The above specification of my invention signed by me, this    day of         , 1868.

MRS. A. W. KIDDER.

Witnesses:
 STEPHEN D. LINDSEY,
 WELLINGTON KIDDER.